No. 702,796. Patented June 17, 1902.
A. C. HOUDYSHELL.
SHOCK LOADING APPARATUS.
(Application filed Dec. 11, 1901.)
(No Model.) 5 Sheets—Sheet 1.
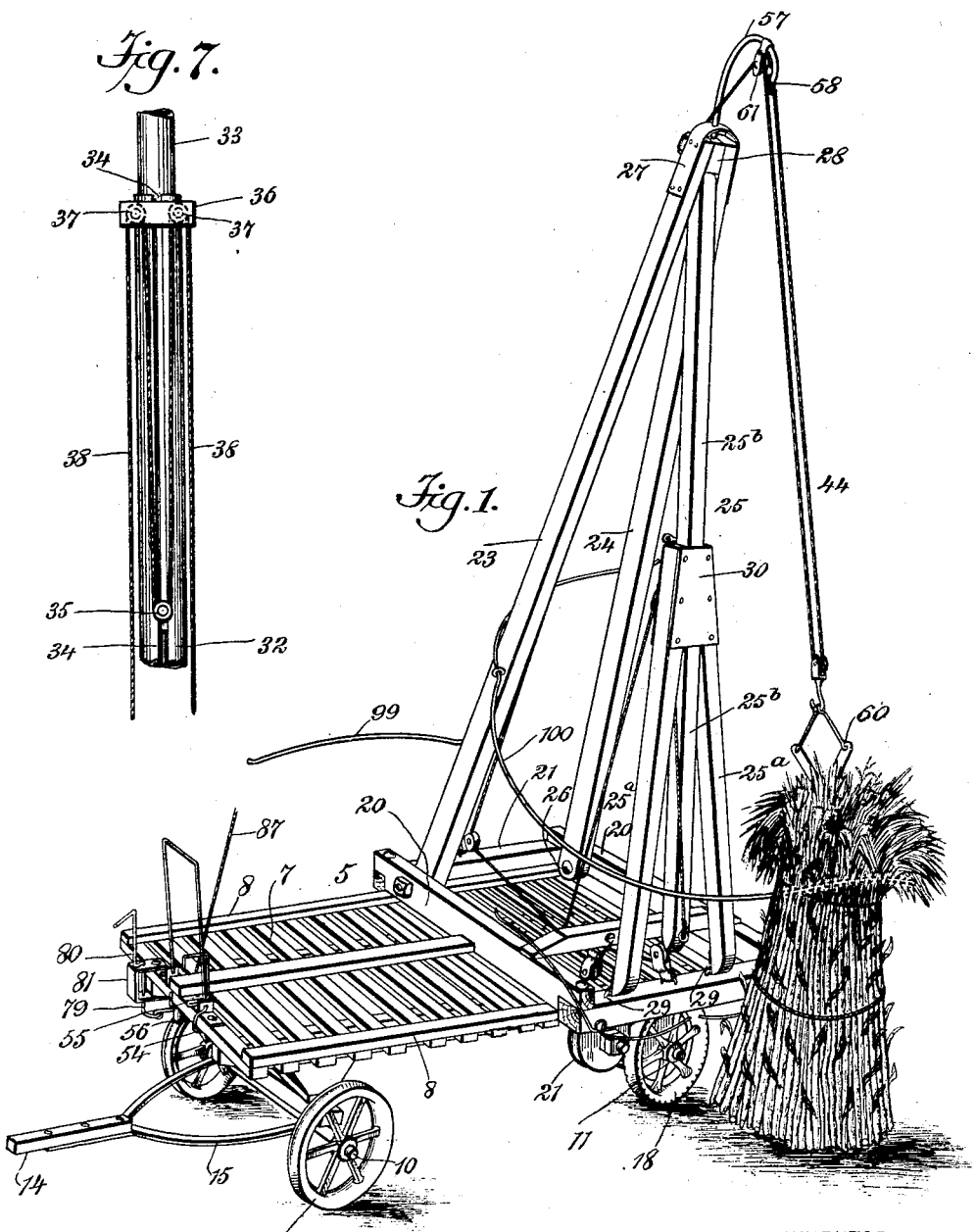
INVENTOR
Aaron C. Houdyshell

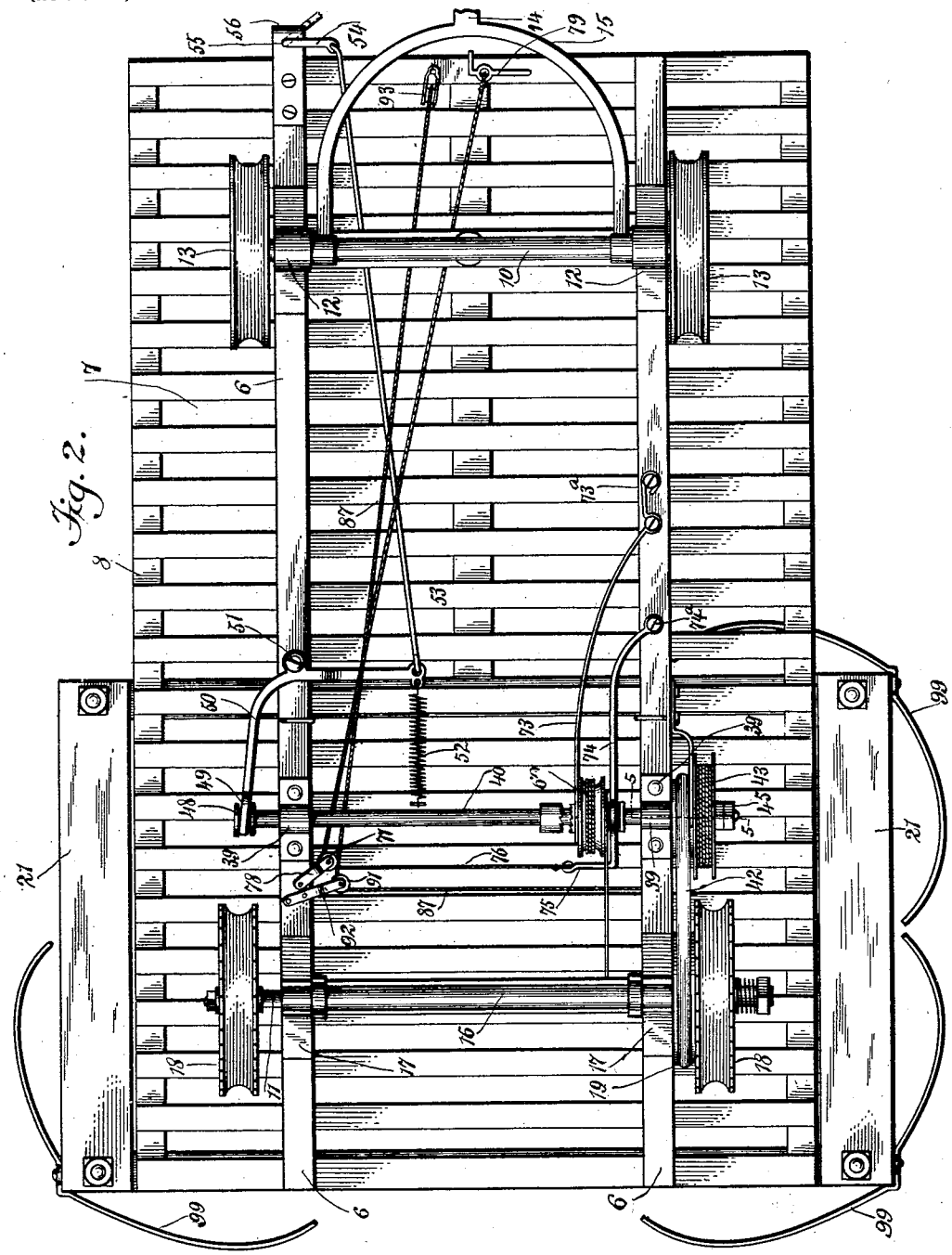

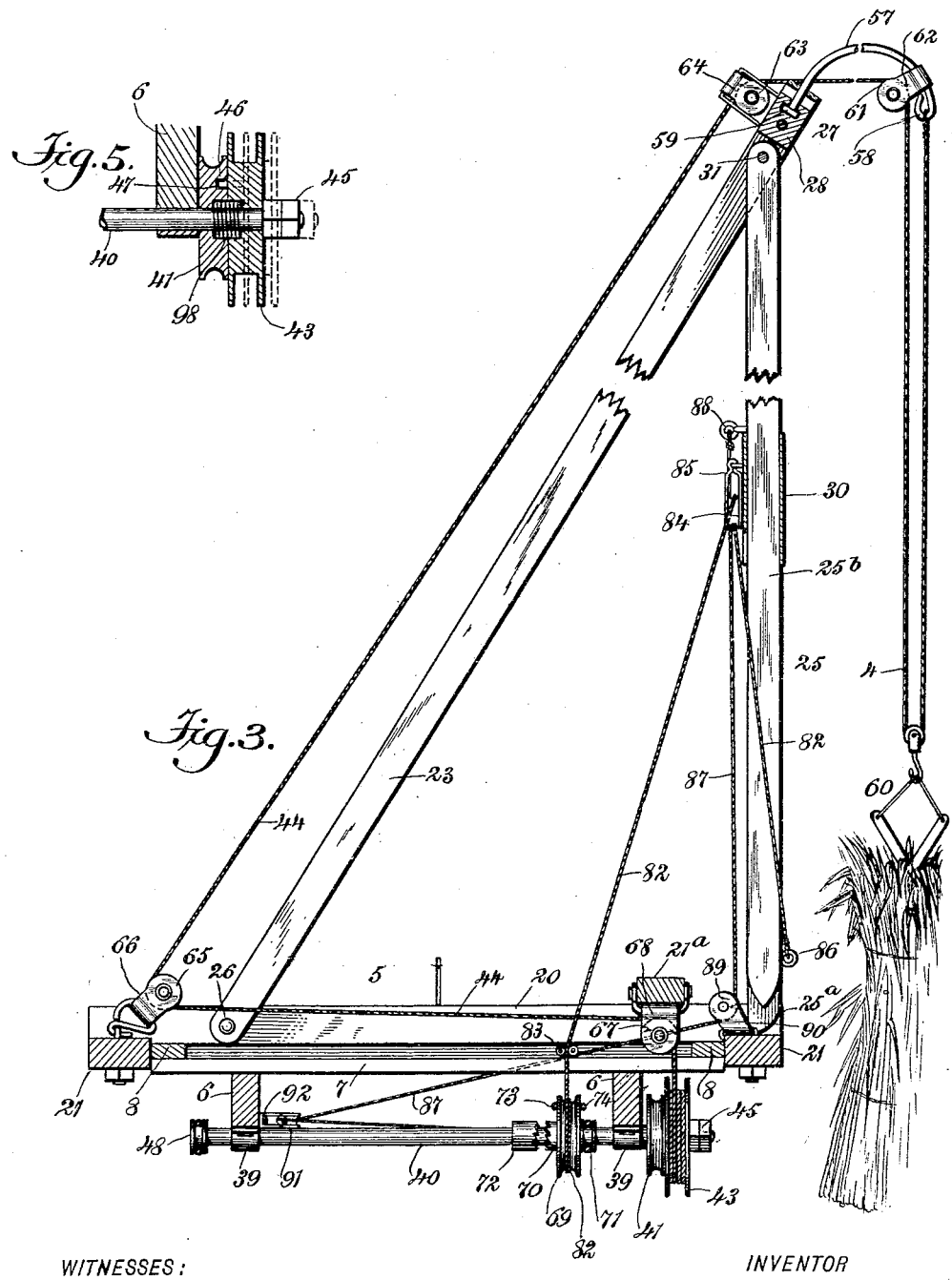

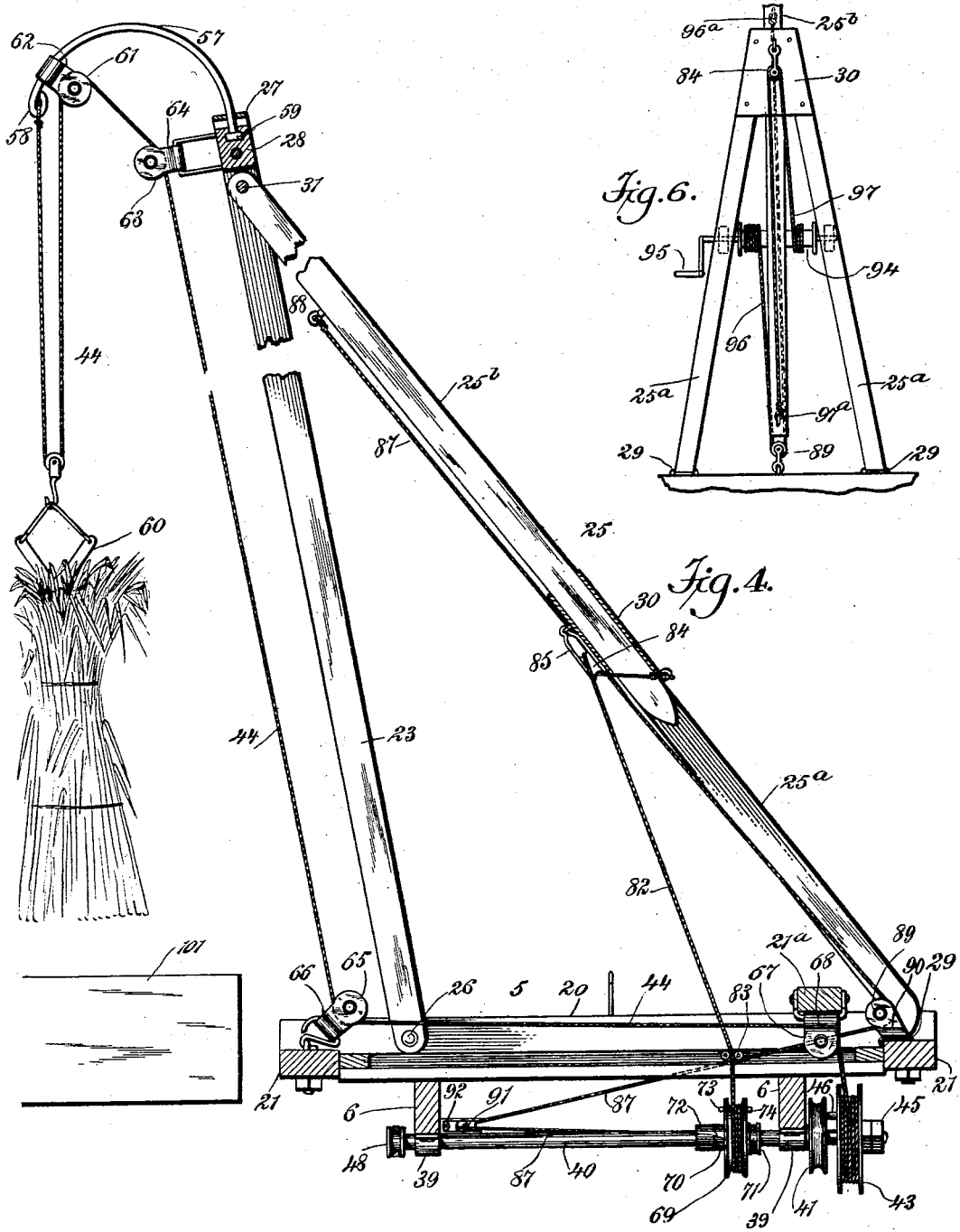

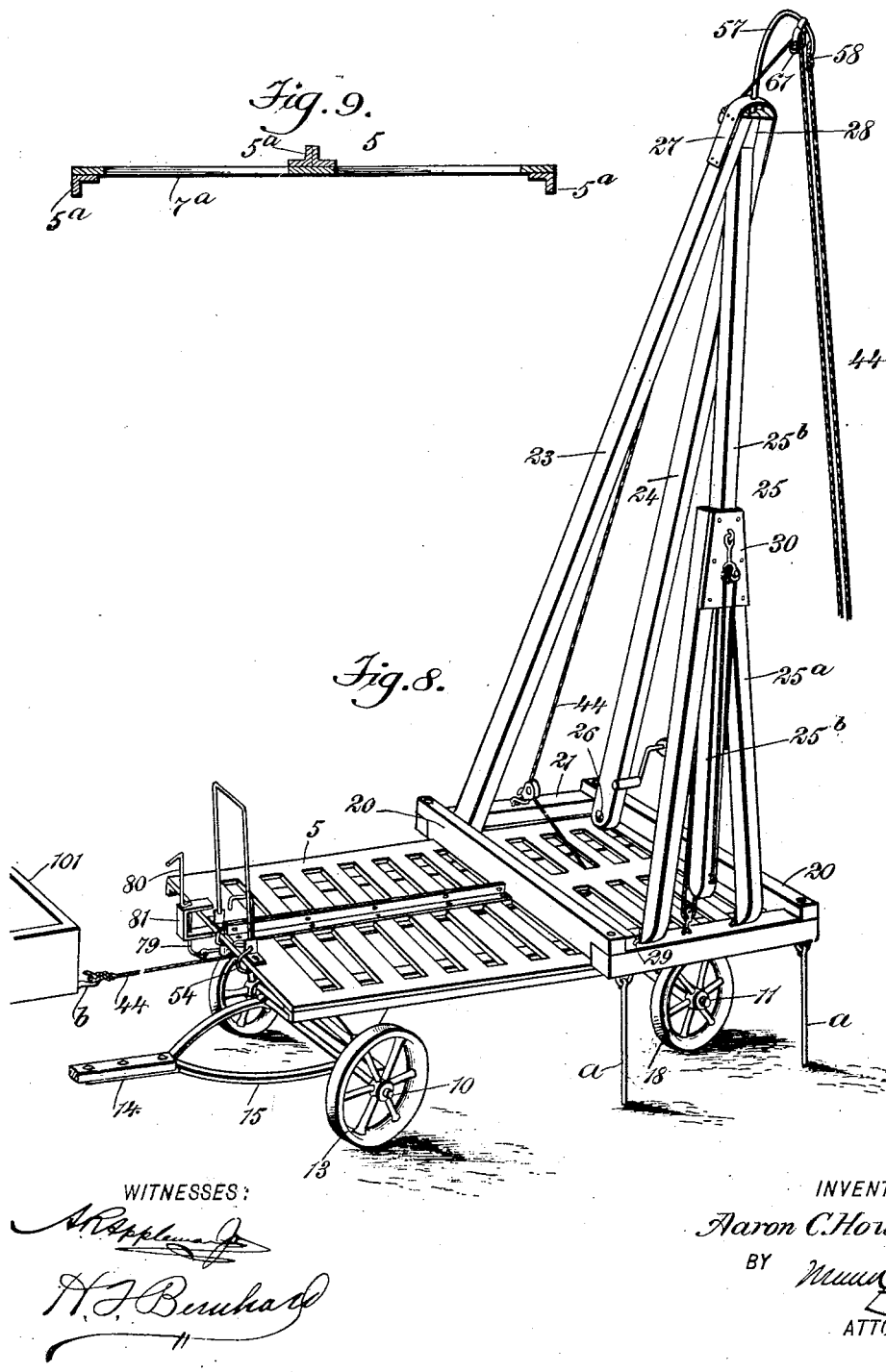

---

UNITED STATES PATENT OFFICE.

AARON CALVIN HOUDYSHELL, OF TAMA, IOWA.

SHOCK-LOADING APPARATUS.

SPECIFICATION forming part of Letters Patent No. 702,796, dated June 17, 1902.

Application filed December 11, 1901. Serial No. 85,421. (No model.)

*To all whom it may concern:*

Be it known that I, AARON CALVIN HOUDYSHELL, a citizen of the United States, and a resident of Tama, in the county of Tama and State of Iowa, have invented new and useful Improvements in Shock-Loading Apparatus, of which the following is a full, clear, and exact description.

My invention relates to improvements in apparatus for loading shocks of any kind of grain upon vehicles, such as a wagon, a sled, or any other portable structure.

One object of the invention is the provision of a portable loading apparatus in which the parts are constructed and arranged to elevate and to deposit the load (which is in the form of a shock of grain) in a vertical path, whereby the grain-shock may be stood up on end for the purpose of transporting the same to a suitable place of storage.

A further object is to provide an improved hoisting mechanism, which is operable by the advancing movement of the loading apparatus, such end being attained in connection with a secondary or transport vehicle or other point of resistance or by motion derived from a shaft or axle of the loading apparatus itself.

A further object is to equip the apparatus with a shiftable derrick for the hoisting-cable, whereby the load may be conveniently deposited in a transport-vehicle.

A further object is to equip the derrick with a shiftable and yieldable crane, which serves to ease the shock or jar on the cable and the apparatus when hoisting and depositing the load.

Further objects are to provide means for conveniently and easily changing the position of the derrick, to control the hoisting-cable, to guide the load in a proper path across the apparatus, to prevent the load during elevation from catching on the framework, and to simplify the construction, as well as to promote the efficiency of the apparatus.

With these ends in view the invention consists in the novel combination of mechanism and in the construction and arrangement of parts, which will be hereinafter fully described and claimed.

Reference is to be had to the accompanying drawings, forming a part of this specification, in which similar characters of reference indicate corresponding parts in all the figures.

Figure 1 is a perspective view of a shock-loading apparatus constructed in accordance with my invention. Fig. 2 is an inverted or bottom plan view of the apparatus. Fig. 3 is a vertical transverse section showing the shiftable derrick adjusted to one position and with the hoisting mechanism in the act of lifting the load. Fig. 4 is another transverse section representing the derrick shifted to its reversed position and with the hoisting mechanism in the act of depositing the load. Fig. 5 is a detail transverse section taken in the plane of the dotted line of 5 5 in Fig. 2, the dotted lines representing the winding-drum in its adjusted inoperative position. Fig. 6 is a detail view of a manually-operable mechanism for adjusting the shiftable derrick. Fig. 7 is a detail view of a modified form of the derrick. Fig. 8 is an elevation of a portable loading apparatus, illustrating certain modifications in the construction of the apparatus represented by Figs. 1 to 7, inclusive; and Fig. 9 is a detail cross-section of a modified construction of the platform which forms a part of the portable wheeled truck.

In carrying my invention into practice I employ a wheeled platform, which may be constructed as shown by the drawings, or the construction thereof may be modified by the skilled constructor. As shown, the platform 5 comprises a series of bed-rails 6, a plurality of transverse slats 7, and the top rails 8, the whole being secured together in any suitable manner; but I reserve the right to employ a metallic construction of the platform in which the rails are made of angle-bars 5ª, and the surface is formed by heavy wire or perforated sheet metal 7ª, as shown by Fig. 9. The platform may be mounted upon a running-gear of any suitable character, but as shown by the drawings, however, the platform is supported by the front axle 10 and the rear axle 11. Said front axle is mounted near its end portions in axle-bearings 12, which are secured to the bed-rails 6, and said axle is equipped with the grooved carrying-wheels 13, the same being especially designed to prevent slippage on the soil. With this front axle may be connected any suitable form of draft appliance; but, as shown by Figs. 1 and 2, said draft appliance is in the form of a pole or tongue 14, and a bail 15, the latter being loosely fitted to the axle.

The rear axle 11 is surrounded loosely nearly throughout its length by a sleeve or elongated bearing 16, which is supported by the boxes 17, but may be made fast with a false bolster, or said boxes may be secured to the bed-rails 6. This rear axle 11 is intended in one embodiment of the invention to furnish the power for the operation of the hoisting mechanism and also for the operation of the derrick-shifting mechanism. The end portions of said axle 11 are extended beyond the sleeve 16 and the boxes 17 for a suitable distance, and to this axle are firmly secured the carrying and driving wheels 18, the same being adapted to impart rotary motion to the axle on the advancement of the machine. As shown more clearly by Fig. 2, these driving-wheels 18 are provided with grooved peripheries forming spaced annular flanges that are notched or roughened in any suitable way, thus minimizing any tendency of the wheels to slip on the ground. The axle 11 is also provided with a driving element, which may be in the form of a sprocket-wheel, although I have represented said driving element in Fig. 2 as consisting of a grooved pulley 19, which is secured firmly near one end portion of the axle next to one of the driving-wheels 18 thereof.

I will now proceed to describe the construction of one form of the derrick, which is shiftably mounted upon the platform 5, preferably at or near the rear end thereof. For supporting this derrick in place I employ a base-frame, which consists of the rails 20 and the side rails 21, the whole being firmly secured together by any approved means. The rails 20 are disposed transversely across the platform 5, and the length thereof is greater than the width of said platform, whereby the end portions of the base-frame extend beyond the platform, and said base-frame may be upheld or braced in position by suitable stays, which may be disposed at the sides of the platform and rest upon the ground, as indicated by the reference-letter $a$, Fig. 8.

The derrick proper consists of non-extensible legs 23 24 and an extensible leg which is indicated in its entirety by the numeral 25, said series of legs being pivotally supported on the base-frame and the upper ends of the legs being connected together in a suitable way to permit the extensible leg to have a limited movement relative to the non-extensible leg. The legs of the derrick (shown by Figs. 1, 3, and 4) are in the form of posts, and the legs 23 24 are pivoted, as at 26, to the base-frame, said legs 23 24 converging in an upward direction and being secured firmly together at the free upper ends by means of a bail 27, a spacing-block 28 being secured between said upper ends of the legs 23 24. The extensible leg 25 in the construction shown by Figs. 1, 3, and 4 consists of the pivoted members $25^a$ and the sliding member $25^b$. Said pivoted members of the extensible leg are connected pivotally, as at 29, to the base-frame, and these members converge upwardly and are provided with a guide-boxing 30, said guide-boxing serving to connect the upper ends of the pivoted members of the leg. The sliding member $25^b$ of the extensible leg is fitted at its upper end between the converging ends of the legs 23 24 and below the spacing-block 28, said slidable leg member $25^b$ being pivoted, as at 31, to the legs 23 24. The members $25^a$ of the extensible leg are spaced within the guide-boxing 30, so as to receive the lower portion of the slidable leg member $25^b$, whereby said slidable member is confined in operative relation to the pivoted members, and the parts composing the extensible leg are free to have movement relative one to the other when the derrick is shifted from one side of the platform to the other, as more clearly shown by Figs. 3 and 4.

I do not desire to restrict myself to the specific construction or material employed in the derrick, and I may employ metal in lieu of the posts. It is evident that metallic tubes or gas-pipes may be substituted for the posts which form the legs 23 24, said metallic tubes adapted to be pivoted on the base-frame and being connected together at their upper ends. The extensible leg 25 of the derrick may also be constructed from metallic tubing in the manner shown by Fig. 7 of the drawings, in which the numeral 32 designates the lower tubular member of the extensible leg, and 33 is the upper member of the leg. The lower member 32 is adapted to be pivotally supported on or connected to the base-frame by any suitable means, and said lower member is of larger diameter than the upper member 33, the latter being slidably fitted in the lower member and having pivotal connection at its upper end with the non-extensible and pivoted legs of the derrick. The lower pivoted member of the metallic extensible leg (shown by Fig. 7) is provided with a longitudinal slot 34, in which is adapted to travel a pulley 35, that is attached to or mounted on the lower extremity of the upper slidable member 33 of said extensible leg. The lower tubular member of the metallic leg is provided at its upper end with a metallic bar 36, on which are mounted the guide-sheaves 37, and around these sheaves 37 and the pulley 35 is reeved an operating-cable 38, whereby the member 33 may be raised with relation to the member 32 in order to lengthen the extensible leg, said leg being adapted to be shortened by the weight or gravity of the parts when the cable 38 is slackened.

The mechanism for adjusting the shiftable derrick will be hereinafter described in connection with power-driven operating devices.

39 designates suitable shaft-bearings which are secured firmly to the platform or framework of the machine, preferably to the bed-rails 6 at a point adjacent to the driving-axle 11. In these shaft-bearings is journaled a main shaft 40, arranged in a horizontal position on the under side of the platform and parallel to the driving-axle 11. (See Fig. 2.) As shown, the main shaft 40 is mounted loosely in its bearings 39, so as to rotate freely therein and be capable of a limited endwise movement, and this shaft 40 is intended to be driven or propelled from the axle 11 by intermediate gearing. As shown, the shaft 40 is provided with a pulley 41, although a sprocket-wheel may be substituted therefor. Said pulley has a grooved periphery, and it is arranged in alinement with the grooved pulley 19 on the driving-axle, whereby an endless belt 42 serves to operatively connect the pulleys 19 and 41 and to transmit motion of the axle to the main shaft. The pulley 41 is shown by the drawings as mounted loosely on the main shaft, to which it is adapted to be clutched, and this pulley lies adjacent to one of the bed-rails 6 and to the winding-drum 43, the latter serving to actuate the hoisting-cable 44. The drum 43 is made fast with the main shaft 40 by any suitable means, such as a key, and held from displacement off the end of the shaft by the nuts 45 or their equivalents, said drum being thus adapted to partake of the rotary motion and the endless adjustment of the shaft 40. The drum is provided with a clutch-pin 46, which is adapted to take or fit into a socket 47, that is provided at one face of the loose pulley 41. (See Figs. 4 and 5.) The pulley 41 is confined between the winding-drum 43 and one of the bed-rails 6 and when the shaft 40 is moved to one position, as shown by Figs. 3 and 5, the clutch-pin 46 enters the socket 47 in order to make the pulley 41 fast with the drum 43 and shaft; but an endwise adjustment of the shaft 40 to the position shown by full lines in Fig. 4 and the dotted lines in Fig. 5 makes the drum 43 withdraw the pin 46 from the pulley, thus allowing said pulley to remain idle or run loosely on the shaft 40.

Any suitable means may be adopted for giving the endwise movement to the shaft 40; but in one embodiment of the invention (shown more clearly by Fig. 2) said shaft is provided at one end with a grooved head 48, with which is loosely engaged the forked end 49 of a bell-crank lever 50, the latter being fulcrumed on one of the bed-rails 6, as at 51. To the other end of said bell-crank lever is connected a retracting-spring 52, which is attached to the platform, and which serves to normally hold the shaft 40 in a position for the winding-drum 43 to clutch the pulley 41 fast to the shaft. To the same arm of the bell-crank having the spring 52 is connected one end of a pitman or rod 53, the same extending beneath the platform 5 and to the front end of the leg, said front end of the pitman being connected loosely to the lower crank-arm 54 of an upright adjusting-shaft 55, the latter being supported in a bracket 56, that is fastened to the front end of the platform.

57 designates a shiftable crane, which is carried at the upper end of the derrick and is movable therewith, although it is capable of an independent movement on a substantially vertical axis. This crane is yieldable or elastic, and it is shown by Figs. 1, 3, and 4 as made from a piece of tempered metal, which is bent to an arched or curved form. This crane is provided at its free end with a guide 58, which is in the form of an eye or loop, and the other end of the crane has a swiveled connection with the derrick, preferably by mounting said crane in the spacing-block 28. The pivoted end of said crane is shown by Figs. 3 and 4 as having an enlarged footpiece 59, that is loosely fitted in a socket which is provided in the spacing-block 28, whereby the crane may turn freely with relation to the derrick and the spacing-block, and at the same time it is held securely in place on the derrick. This crane passes through the bail 27, which unites the legs 23 24 of the derrick, thus making the bail serve as a brace for the crane.

60 designates a grapple or fork adapted to engage with the load which it is desired to elevate, and this grapple may be of any form approved by the constructor, although I prefer to employ a special form of grapple which I have invented. The grapple may, however, be of the form familiar to those skilled in the art, the same consisting of pivoted members having suitable means through which the hoisting-cable 44 may be reeved. One end of this cable 44 is attached to the guide 58 of the crane, and this cable takes the following course through the apparatus, or rather through certain sheaves, to wit: From its attachment to the crane 57 the cable 44 is carried to and through a pulley-block on which is hung the grapple 60. From thence the cable is carried upwardly and passes over a sheave 61, that is attached by a hanger or bracket 62 to the swivel-crane 57. From thence the cable 44 is carried over and in the rear of a sheave 63, which is supported by a swiveled bracket 64 on the upper end of the derrick or the spacing-block 28 thereof. From thence the cable passes in a downward direction to and beneath a guide-sheave 65, which is attached by a swiveled block 66 to one of the side rails 21 of the base-frame. From thence the cable passes horizontally across the platform to and over the guide-sheave 67, that is suspended by the swiveled hanger 68 from the cross-bar 21ᵃ of the base-frame, and finally said cable passes to and is coiled around the winding-drum 43.

I will now proceed to describe the power-actuating means for shifting the position of the derrick.

A spool 69 is loosely mounted on the main shaft 40, preferably at a point between the bed-rails 6, and this spool is provided on one side with a clutch-face 70 and on its other side with a grooved sleeve 71. (See Figs. 2, 3, and 4.) The clutch-face 70 of the loosely-mounted spool is disposed opposite to a clutch member 72, that is made fast with the shaft 40, so as to rotate therewith and to partake of its endwise adjustment; but the spool 69 is prevented from sliding with the shaft or with the clutch 72 by means of a detaining-arm 73 and the shipping-lever 74. The arm 73 is shown by Fig. 2 as attached to the platform, as at 73ª, and as having engagement with that face of the spool having the clutch-face 70. The shipping-lever 74 is mounted or fulcrumed, as at 74ª, on the under side of the platform, and this lever is provided with an angular arm 75 at its free end, to which arm is connected the adjusting-rope 76, which passes across the platform and around a guide-sheave 77, that is supported by a bracket 78 on one of the bed-rails 6. Said adjusting-rope passes from the sheave 77 lengthwise of and beneath the platform, so that it may be fastened at its free end to the lower crank-arm 79 of an upright adjusting-shaft 80, which is mounted in a bracket 81 in the front end of the platform. (See Fig. 1.) The lever 74 is loosely connected at a point intermediate of its length with the grooved sleeve 71 of the loose spool, and this lever may be operated by the cord 76 and the shaft 80, so as to slide the spool 69 on the shaft 40 and against the resistance of the yieldable arm 73, whereby the clutch-face 70 of the spool may engage with the clutch-face 72, and the spool may be made fast with the shaft 40, so as to be rotated thereby.

A haulage-cable 82 is coiled around and fastened to the spool 69, from which spool the haulage-cable is carried in an upward direction between the guide-sheaves 83 and the platform. This cable is furthermore carried upward and over the guide-sheave 84, which is suspended by a hanger 85 from the guide-boxing 30 of the extensible leg, and finally this cable 82 is carried in a downward direction and is attached at 86 to the slidable member 25ᵇ of the extensible leg. When the derrick occupies the position shown by Fig. 3, the spool 69 remains loose on the shaft 40, and the slidable member 25ᵇ of the extensible leg is lowered within the pivoted member 25ª of said leg. After the shock or load shall have been raised a proper height above the ground the operator may adjust the shaft 80 and the lever 74, so as to throw the spool 69 into engagement with the clutch 72, thus making the shaft 40 drive the spool 69 on the motion or advancement of the machine. The rotation of the spool 69 winds the cable 82 thereon and draws upward on the slidable member 25ᵇ of the extensible leg, forming a part of the derrick, whereby the legs 23 24 of the derrick will be forced laterally and the derrick will be made to assume the position shown by Fig. 4. The derrick is thus shifted by power connections with the main shaft, and the load which is suspended from the derrick will be carried across the platform of the loading apparatus.

The sliding member 25ᵇ of the extensible derrick-leg may be lowered by gravity or by the weight of the derrick; but to start the derrick in motion in order to return it from the position shown by Fig. 4 and to resume the position indicated by Fig. 3 I have provided a pull-cable 87, which is fastened, as at 88, to the slidable member 25ᵇ of the derrick-leg, said cable passing in a downward direction around the guide-sheave 89, that is mounted by a swiveled bracket 90 on one of the rails 21 of the base-frame. This pull-cable thence extends in a downward direction through the platform and across the latter, said cable passing around one of a pair of guide-sheaves 91, attached by brackets 92 to one of the bed-rails 6. (See Figs. 2, 3, and 4.) From the sheave 91 the pull-cable 87 passes beneath the platform and in a forward direction to a sheave 93, that is supported at the front end of said platform, and from this sheave the pull-cable passes upwardly through the platform, as shown by Fig. 1, thus disposing the front end of the cable in position to be grasped by the operator standing on the platform. The free end of this cable 87 may be fastened to the platform by any suitable means. It is evident that the operator may pull on the cable 87, so as to haul down on the slidable member 25ᵇ of the derrick-leg, thus pulling the legs 23 24 of the derrick into position shown by Fig. 3.

In Fig. 6 of the drawings I have shown another embodiment of means for adjusting the extensible leg of the derrick by hand-power. In this figure a windlass or drum 94 is journaled in the guide-boxing 30 or the members 25ª of the extensible leg, and this windlass is provided with a suitable crank 95 or other means for rotating said windlass. The cables 96 97 are coiled in opposite directions on the drum by the windlass, so that the rotation of the windlass in one direction will serve to coil one cable thereon and to unwind the other cable therefrom. The cable 96 extends downwardly from the windlass beneath the sheave 89 and thence extends in an upward direction for attachment to the slidable member of the derrick-leg, as at 96ª. The other cable 97 extends upwardly from the windlass over the sheave 84 and is attached at 97ª to said slidable member of the extensible leg. It will be seen that when the windlass is rotated in one direction the cable 96 is uncoiled from the windlass, whereas the cable 97 is coiled on the windlass for the purpose of elevating the slidable member of the derrick-leg; but a reverse rotation of the windlass lowers said slidable member of the derrick-leg. Any suitable means may be provided, such as a pawl and ratchet, for locking the windlass against rotation.

By reference to Fig. 5 of the drawings it will be seen that a spring 98 is interposed between the winding-drum 43 and the driving-pulley 41. This spring serves to force the pulley 41 away from the drum when the shaft 40 is moved endwise in a direction to make the drum assume the dotted-line position, thus unclutching the pin 46 from the pulley 41 and preventing said pulley from partaking of the slidable movement of the shaft 40 and the drum 43.

99 designates a series of curved guards, which are supported at the corners of the base-frame that is placed transversely on the platform. These guards curve outwardly from the frame, and they prevent the load from striking against or catching into the projecting parts of the framework.

The axle 11 may be made of any desired length, and I prefer to make this axle quite long in order that the driving-wheels 18 may be spread quite a distance apart, thus preventing the machine from tipping over toward either side when the load is unevenly distributed on the platform or the derrick.

A guide 100 is secured to one of the legs, as 23, of the derrick, said guide having a member which extends part way around the derrick and beyond that side of the machine which is to receive the load. This arm of the guide is disposed in the path of the load when the latter is raised by the hoisting mechanism, and said arm serves to direct the load in a proper path when the derrick is shifted from one position to the other.

Although I have shown and described an ordinary grapple, it will be understood that the grapple may be provided with a trip device which is adapted to be released by the pull-rope, so as to discharge the load from the grapple at the proper time. I reserve the right to employ any substitute, such as a sling, for the grapple.

The operation may be described as follows: With the derrick in position (shown by Fig. 3) the shaft 40 is moved endwise, so as to disengage the winding-drum 43 from the pulley 41, thus releasing the hoisting-cable 44 and allowing the grapple to be drawn in a downward direction. The grapple is now adjusted to engage with the load, the shaft 40 having been returned by the spring 98 to its normal position and the drum 43 clutched to the pulley 41, leaving the spool 69 free from engagement with the clutch 72. The loading apparatus is now moved or drawn in a forward direction by a team of horses, and alongside of the loading apparatus is driven another vehicle which is designed to receive the shocks of grain, a portion of said vehicle being indicated at 101 in Fig. 4. On the movement of the loading apparatus the drum 43 is driven by the shaft 40, which is propelled by the axle 11, and the cable 44 is wound on said drum 43 and elevates the grapple 60 and the load. As the extensible leg of the derrick lies in a vertical position and as the crane 57 projects laterally from one side of the loading apparatus, the hauling-cable 44 is adapted to raise the load in a perpendicular path.

After the load shall have been raised the required distance, preferably to a point sufficient to clear the platform 5, the operator adjusts the lever 74 by turning the shaft 80, and the spool 69 is engaged with the clutch 72, so as to make said spool rotate with the shaft 40, whereby the cable 82 is coiled on the spool and the member $25^b$ of the extensible derrick-leg is raised. This elevation of said member $25^b$ forces the legs 23 24 to turn on their pivots 26, and the derrick is made to assume the position shown by Fig. 4, thus moving the suspended load over and across the platform and causing the cable 44 to suspend the load beyond the opposite side of the platform and at a point clear of the machine. The drum 43 may now be unclutched from the pulley 41 by proper adjustment of the shaft 40, and the cable 44 may uncoil from said drum sufficiently to lower the grapple and deposit the load in the vehicle 101. The spool 69 may now be unclutched from the shaft 40, and the cable 87 may be pulled by hand, so as to lower the slidable member $25^b$ of the derrick-leg, thereby reversing the derrick and restoring the parts to the position in Fig. 3 in order to resume the position heretofore described.

Although I have shown and described a specific embodiment of means for operating the hoisting-cable 44 on the adjustment of the machine, I desire to say that under some circumstances the winding-drum 43 and its associated parts may be omitted. The hoisting-cable 44 may be led or conducted by suitable sheaves along the platform, so as to extend away from the loading apparatus, and the distant end of this hoisting-cable may be equipped with a hook $b$ or any other suitable device, which is adapted to be engaged with a part of the vehicle 101, the latter affording the fixed point of resistance for the haulage-cable when the loading apparatus is driven away from the vehicle, whereby the cable 44 is operated so as to raise the load. This method of operating the cable 44 by the advancing movement of the loading apparatus may be resorted to if it is desired to simplify the mechanism of the loader, and the described arrangement of parts is clearly indicated by Fig. 8.

Having thus described my invention, I claim as new and desire to secure by Letters Patent—

1. A portable loading apparatus comprising a wheeled truck, a reversible derrick having the extensible and non-extensible legs pivoted to the truck and adapted to be shifted from side to side thereof, means for extending or contracting the extensible leg and thereby imparting the reversible or shiftable adjustment to the derrick, and a hoisting mechanism mounted on the derrick and shiftable therewith from one side to the other of the truck.

2. A portable loading apparatus comprising a truck, a reversible derrick having its members pivoted to the truck and shiftable from side to side thereof, means for giving the shiftable or reversible adjustment to said derrick, and a hoisting-cable guided on the derrick for adjustment therewith and operable by the advancing movement of the apparatus.

3. A portable loading apparatus comprising a truck, a derrick having its legs pivoted to the truck, means for adjusting the derrick and shifting it from one side to the other of the truck, an arm mounted on the derrick and shiftable therewith to project from either side of the truck, and a hoisting-cable guided by the arm and operable by the advancing movement of the apparatus.

4. A portable loading apparatus, comprising a wheeled truck, a reversible derrick mounted thereon to swing from one side to the other of the truck, a crank supported on the derrick to be shiftable therewith and also capable of an independent movement thereon, and a hoisting-cable operatively related to the crane and adapted to be operated by the travel of the apparatus.

5. A portable loading apparatus provided with a reversible derrick, a crane carrying a sheave and mounted on the derrick to be adjusted therewith and also capable of an independent movement thereon, and a hoisting-cable attached at one end to said crane and reeved through the sheave thereon.

6. A portable loading apparatus, comprising a wheeled truck, a derrick reversibly mounted on said truck for adjustment from side to side thereof, a yieldable or elastic crane-arm mounted on said derrick for adjustment therewith, and a hoisting-cable operatively related to said crane-arm.

7. A loading apparatus comprising a wheeled truck, a derrick reversibly mounted on said truck to be shiftable to either side of the same and provided at its upper end with a bearing, an arched crane swiveled in said bearing of the derrick and adapted to project therefrom in either of the operative positions of the derrick, and a hoisting-cable guided by said crane.

8. A portable loading apparatus, comprising a wheeled truck, a derrick reversibly mounted thereon, an arched yieldable crane-arm swiveled on the upper portion of the derrick and adapted to be shifted therewith and capable of a limited elastic movement under the strain of the load, and a hoisting-cable connected to and guided by said crane-arm.

9. In a loading apparatus, the combination of a portable truck, a shiftable derrick mounted thereon and adapted to assume an operative position on either side of said truck, a swiveled crane mounted on the derrick to be shiftable therewith and arranged to project beyond one side or the other of the platform, and a hoisting-cable actuated by the advancing movement of the apparatus.

10. In a loading apparatus, the combination of a wheeled truck, a base-frame mounted on the truck and extending beyond the opposite sides thereof, a shiftable derrick having its legs pivoted on the truck, a crane carried by said derrick, and a hoisting-cable operable by the advancing movement of the apparatus.

11. A portable loading apparatus, comprising a wheeled truck, a shiftable derrick pivotally supported thereon, an arched crane-arm mounted at the head of the derrick for adjustment thereon and adapted to project beyond the truck in either adjusted position of said derrick, guide-sheaves attached to the crane-arm and to the derrick, and a hoisting-cable attached to the crane-arm and reeved through the guide-sheaves.

12. A portable loading apparatus, comprising a wheeled truck, a derrick reversibly mounted thereon to swing from side to side and having pivoted legs and an extensible leg, devices actuated by the travel of the truck and connected operatively with the extensible leg, whereby the members of said leg may be positively moved with relation to one another, and a hoisting mechanism supported by and adjustable with said derrick.

13. A portable loading apparatus, comprising a wheeled truck, a derrick reversibly mounted thereon and having pivoted legs and an extensible leg connected with said pivoted legs, a shaft adapted to be driven by the travel of the truck, a winding-spool on said shaft, and connections between said extensible leg and said spool, whereby the derrick may be shifted in one direction by power devices and is adapted to be shifted by gravity in the opposite direction.

14. A loading apparatus comprising a wheeled truck, a derrick reversibly mounted thereon and having an extensible leg, a shaft adapted to be rotated by the travel of the truck, a winding-spool loose on said shaft, a clutch adapted to make the spool fast with said shaft, and a cable connecting the extensible leg and said spool.

15. In a loading apparatus, the combination of a shiftable derrick having pivoted and extensible legs, power connections for positively extending said legs, and a pull-cable having operative connection with one member of the extensible leg.

16. In a loading apparatus, the combination of a wheeled truck and a derrick thereon, of a hoisting-cable, an endwise-adjustable shaft on the truck, a pulley mounted idly on said shaft and adapted to be driven from one of the truck-wheels, a drum on said shaft, and means whereby the shaft and the drum may be thrown into and out of operation.

17. In a loading apparatus, the combination of a truck, a shiftable derrick, a main shaft, clutch-controlled devices driven from said shaft and operatively related to the derrick for shifting the latter, a hoisting-cable, and clutch-controlled driven devices operatively related to said shaft and independent of the derrick-shifting mechanism for operating the hoisting-cable.

18. In a loading apparatus, the combination of a truck, a shiftable derrick erected thereon, a hoisting mechanism supported by said derrick, and a guard curved outwardly from and beyond said derrick and projecting into the path of the load adapted to be elevated by the hoisting mechanism.

19. A loading apparatus, comprising a wheeled truck having a platform, and a base-frame on said platform, a derrick mounted on the base-frame, guards arranged at the corners of the base-frame, and a hoisting mechanism supported by the derrick.

In testimony whereof I have signed my name to this specification in the presence of two subscribing witnesses.

AARON CALVIN HOUDYSHELL.

Witnesses:
WILLIAM S. WILLETT,
FRANK F. DAVIDSON.